US00RE50094E

(19) United States
(12) Reissued Patent
Lee

(10) Patent Number: US RE50,094 E
(45) Date of Reissued Patent: Aug. 27, 2024

(54) DISPLAY SCREEN WITH ICON

(71) Applicant: Google LLC, Mountain View, CA (US)

(72) Inventor: Sehee Lee, Brooklyn, NY (US)

(73) Assignee: GOOGLE LLC, Mountain View, CA (US)

(21) Appl. No.: 29/725,152

(22) Filed: Feb. 21, 2020

Related U.S. Patent Documents

Reissue of:
(64) Patent No.: Des. 853,442
Issued: Jul. 9, 2019
Appl. No.: 29/643,579
Filed: Apr. 10, 2018

(51) LOC (14) Cl. ..... 14-04
(52) U.S. Cl.
USPC ..... D14/487
(58) Field of Classification Search
USPC ..... D14/485–495; D18/26, 31, 32, 33; D20/11, 12, 23, 24, 25, 29, 30, 31, 32, D20/36, 37, 38
CPC ..... G06F 3/048; G06F 3/0481; G06F 3/0482; G06F 3/04817; G06F 3/04812; H04L 12/581; H04L 12/1813; H04L 51/32
See application file for complete search history.

(56) References Cited

U.S. PATENT DOCUMENTS

| | | | | | |
|---|---|---|---|---|---|
| 5,809,449 | A | | 9/1998 | Harper | |
| D399,837 | S | | 10/1998 | Garguilo | |
| D437,859 | S | | 2/2001 | Alvarez et al. | |
| D533,872 | S | | 12/2006 | Ligameri et al. | |
| D623,195 | S | * | 9/2010 | La | D14/489 |
| D667,452 | S | | 9/2012 | Wujcik et al. | |
| D667,457 | S | * | 9/2012 | Wujcik | D14/492 |
| D676,870 | S | * | 2/2013 | Steele | D14/492 |
| D677,278 | S | | 3/2013 | Wujcik et al. | |
| D688,703 | S | * | 8/2013 | Phelan | D14/492 |
| D703,227 | S | * | 4/2014 | Abratowski | D14/489 |
| D712,427 | S | * | 9/2014 | Fujioka | D14/486 |
| D726,763 | S | * | 4/2015 | Moon | D14/492 |
| D726,765 | S | * | 4/2015 | Dye | D14/492 |
| D727,965 | S | * | 4/2015 | Kwon | D14/492 |
| D730,938 | S | * | 6/2015 | Ma | D14/492 |
| D736,817 | S | * | 8/2015 | Trabona | D14/487 |
| D738,381 | S | * | 9/2015 | Kim | D14/485 |
| D738,385 | S | * | 9/2015 | Lim | D14/485 |

(Continued)

OTHER PUBLICATIONS

"Multimedia photo and video." iconfinder.com. Jun. 11, 2017. Accessed Feb. 12, 2019. Available online at URL: <https://www.iconfinder. com/iconsets/multimedia-photo-and-video> (Year:2017). (1 page).

(Continued)

*Primary Examiner* — Darlington Ly
(74) *Attorney, Agent, or Firm* — Plumsea Law Group, LLC

(57) CLAIM

The ornamental design for a display screen with icon, as shown and described.

DESCRIPTION

[The sole FIGURE] *FIG. 1* is a front view *of a first embodiment* of a display screen with icon, showing the new design[.]; *and,*
*FIG. 2 is a front view of a second embodiment of a display screen with icon showing the new design.*
The broken lines of uneven length show the display screen and form no part of the claimed design.

1 Claim, 2 Drawing Sheets

Matter enclosed in heavy brackets [ ] appears in the original patent but forms no part of this reissue; matter printed in italics indicates the additions made by reissue.

(Amended) (New)

(56) References Cited

U.S. PATENT DOCUMENTS

| | | | | | |
|---|---|---|---|---|---|
| D740,322 | S | * | 10/2015 | Dye | D14/492 |
| D746,864 | S | | 1/2016 | Dellinger | |
| D748,135 | S | * | 1/2016 | Kim | D14/489 |
| D749,632 | S | * | 2/2016 | Park | D14/489 |
| D752,609 | S | * | 3/2016 | Lim | G06F 3/04817 D14/485 |
| D754,722 | S | | 4/2016 | Xu | |
| D756,414 | S | * | 5/2016 | Jin | D14/492 |
| D757,026 | S | * | 5/2016 | Lim | D14/485 |
| D760,764 | S | * | 7/2016 | Hwang | D14/487 |
| D761,316 | S | * | 7/2016 | Park | D14/492 |
| D766,954 | S | * | 9/2016 | Smith | D14/486 |
| D766,974 | S | * | 9/2016 | Sano | D14/489 |
| D767,628 | S | | 9/2016 | Kim et al. | |
| D769,325 | S | * | 10/2016 | Casalegno | D14/492 |
| D771,134 | S | * | 11/2016 | Lee | D14/492 |
| D774,093 | S | * | 12/2016 | Dye | D14/492 |
| D775,207 | S | * | 12/2016 | Vulk | D14/492 |
| D777,777 | S | | 1/2017 | Park et al. | |
| D779,556 | S | * | 2/2017 | Yuk | D14/492 |
| D791,177 | S | | 7/2017 | Sakuma | |
| D792,444 | S | * | 7/2017 | Cho | D14/488 |
| D801,388 | S | * | 10/2017 | Sun | D14/492 |
| D802,017 | S | | 11/2017 | Dragoi et al. | |
| D803,848 | S | * | 11/2017 | Hwang | D14/485 |
| D818,002 | S | | 5/2018 | Park et al. | |
| D824,957 | S | * | 8/2018 | Seo | D14/491 |
| D826,263 | S | | 8/2018 | Silva | |
| D829,222 | S | * | 9/2018 | Choi | D14/485 |
| D829,241 | S | * | 9/2018 | Clapper | D14/489 |
| D829,764 | S | * | 10/2018 | Clapper | D14/489 |
| D835,664 | S | * | 12/2018 | Chaudhri | D14/487 |
| D838,742 | S | * | 1/2019 | Clapper | D14/489 |
| D853,442 | S | * | 7/2019 | Lee | D14/492 |
| D861,018 | S | * | 9/2019 | Anzures | D14/486 |
| D861,037 | S | * | 9/2019 | Carrigan | D14/492 |
| D867,396 | S | * | 11/2019 | Ingel | D14/492 |
| D873,284 | S | * | 1/2020 | Dascola | D14/486 |
| D881,940 | S | * | 4/2020 | Lee | D14/492 |
| D905,751 | S | * | 12/2020 | Lee | D14/492 |
| D919,657 | S | | 5/2021 | Hamaguchi | |
| D933,100 | S | | 10/2021 | Hamaguchi | |
| 2004/0190729 | A1 | | 9/2004 | Yonovitz et al. | |
| 2008/0242356 | A1 | | 10/2008 | Marui et al. | |
| 2010/0175022 | A1 | * | 7/2010 | Diehl | G06F 3/0481 715/784 |
| 2011/0083103 | A1 | | 4/2011 | Shim et al. | |
| 2013/0060379 | A1 | | 3/2013 | Choe et al. | |
| 2014/0101576 | A1 | | 4/2014 | Kwak et al. | |
| 2015/0115971 | A1 | | 4/2015 | Kim et al. | |
| 2016/0253071 | A1 | * | 9/2016 | Mishra | G06F 3/04817 715/811 |

OTHER PUBLICATIONS

"IOT Color 1." iconfinder . com. Nov. 18, 2017. Accessed Feb. 12, 2019 . Available online at URL: <https://www.iconfinder.com/iconsets/iot-colorl> (Year:2017). (1 page).

"Multimedia photo and video." iconfinder.com. Jun. 11, 2017. Accessed Feb. 12, 2019. Available online at URL: <https://www.iconfinder.com/iconsets/multimedia-photo-and-video> (Year: 2017).*

"IOT Color 1." iconfinder.com. Nov. 18, 2017. Accessed Feb. 12, 2019. Available online at URL:<https://www.iconfinder.com/iconsets/iot-color1> (Year: 2017).*

* cited by examiner

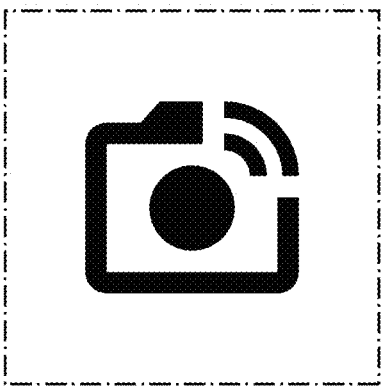
FIG. 1
(Amended)

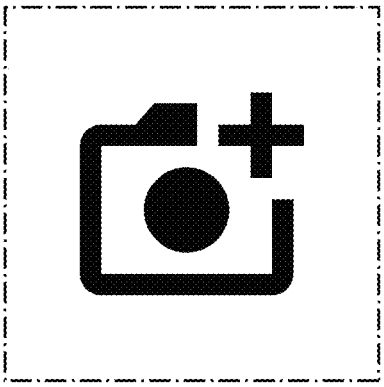
FIG. 2
(New)